United States Patent
Sasaki et al.

(10) Patent No.: US 7,026,371 B2
(45) Date of Patent: Apr. 11, 2006

(54) ELECTRON BEAM CURABLE URETHANE RESIN FOR MAGNETIC RECORDING MEDIUM, METHOD OF MANUFACTURING THE SAME, AND MAGNETIC RECORDING MEDIUM USING THE SAME

(75) Inventors: Hideki Sasaki, Tokyo (JP); Hiroyuki Yamada, Tokyo (JP); Kenichi Kitamura, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 51 days.

(21) Appl. No.: 10/397,169

(22) Filed: Mar. 27, 2003

(65) Prior Publication Data

US 2004/0034165 A1    Feb. 19, 2004

(30) Foreign Application Priority Data

Mar. 29, 2002 (JP) ............................. 2002-097601

(51) Int. Cl.
- C08L 75/16 (2006.01)
- C08L 75/14 (2006.01)
- C08F 2/54 (2006.01)
- C08J 3/28 (2006.01)
- G11B 5/62 (2006.01)

(52) U.S. Cl. .................. 522/90; 360/131; 428/423.1; 428/900; 522/96; 522/174; 525/455; 525/457; 528/73

(58) Field of Classification Search ............... 525/455, 525/457; 360/131; 428/423.1, 900; 528/73; 522/90, 96, 174

See application file for complete search history.

(56) References Cited

U.S. PATENT DOCUMENTS

| | | | | |
|---|---|---|---|---|
| 4,632,878 A | * | 12/1986 | Okita et al. | 428/425.9 |
| 4,647,506 A | * | 3/1987 | Colon et al. | 428/413 |
| 4,652,274 A | * | 3/1987 | Boettcher et al. | 51/298 |
| 4,716,077 A | * | 12/1987 | Okita et al. | 428/328 |
| 4,876,149 A | * | 10/1989 | Ramharack | 428/425.9 |
| 4,943,479 A | * | 7/1990 | Yamada et al. | 428/331 |
| 4,959,263 A | * | 9/1990 | Aonuma et al. | 428/329 |
| 5,134,035 A | * | 7/1992 | Kumar et al. | 428/425.9 |
| 5,218,072 A | * | 6/1993 | Kumar et al. | 528/59 |
| 5,244,739 A | * | 9/1993 | Carlson et al. | 428/425.9 |
| 5,322,861 A | * | 6/1994 | Tsuge et al. | 522/90 |
| 2004/0091632 A1 | * | 5/2004 | Matsunami et al. | 427/457 |

FOREIGN PATENT DOCUMENTS

| | | |
|---|---|---|
| JP | 1-25141 | 5/1989 |
| JP | 3-1727 | 1/1991 |
| JP | 4-67314 | 3/1992 |
| JP | 2514682 | 4/1996 |
| JP | 2610468 | 2/1997 |

* cited by examiner

Primary Examiner—Rabon Sergent

(57) ABSTRACT

An electron-beam curable polyurethane resin for magnetic recording media is produced by modifying a polyurethane resin having active hydrogen in the molecule thereof with a compound having at least two acrylic double bonds, wherein the modification is performed on the active hydrogen so that the polyurethane resin becomes electron-beam curable. By subjecting a known thermosetting polyurethane resin to electron-beam sensitive modification, the resulting resin is highly crosslinked and is thus capable of being suitably used for magnetic recording media. Also, an electron-beam curable polyurethane resin having excellent crosslinking characteristics can easily be produced from the known thermosetting polyurethane resin. Furthermore, by using the electron-beam curable polyurethane resin, a high-performance magnetic recording medium can be provided.

18 Claims, No Drawings

ELECTRON BEAM CURABLE URETHANE RESIN FOR MAGNETIC RECORDING MEDIUM, METHOD OF MANUFACTURING THE SAME, AND MAGNETIC RECORDING MEDIUM USING THE SAME

BACKGROUND OF THE INVENTION

1. Field of the Invention

The present invention relates to an electron-beam curable polyurethane resin for magnetic recording media (hereinafter referred to as an electron-beam curable resin in some cases), to a method for producing the same, and to a magnetic recording medium using the same. More specifically, the present invention relates to an electron-beam curable polyurethane resin having excellent crosslinking characteristics and which is suitably used for magnetic recording media, to a method for producing the electron-beam curable polyurethane resin having excellent crosslinking characteristics by electron-beam sensitive modification of a common thermosetting polyurethane resin, and to a magnetic recording medium using the electron-beam curable polyurethane resin.

2. Description of the Related Art

Resins conventionally used for magnetic recording media typically include thermosetting resins and electron-beam curable resins. The thermosetting resins are cured by allowing active hydrogen in the resins, which is typically the hydroxy group, to react with an isocyanate compound to form crosslinks in the resins. On the other hand, the electron-beam curable resins are cured by introducing an electron-beam sensitive functional group, which is typically the acrylic double bond, and exposing the resins to an electron beam to form crosslinks.

In general, vinyl chloride resins and polyurethane resins are used as the electron-beam curable resins for magnetic recording media. For electron-beam sensitive modification of the vinyl chloride resins, the hydroxy group of a thermosetting vinyl chloride resin having a hydroxy group may be allowed to react with a tolylene diisocyanate (TDI) adduct produced by a reaction between TDI and 2-hydroxyethyl methacrylate (2-HEMA) (disclosed in Japanese Examined Patent Application Publication No. 1-25141), allowed to react with a cyclic anhydride and further react with an epoxy monomer having an acrylic double bond (disclosed in Japanese Patent No. 2514682), or allowed to react with 2-isocyanateethyl(meth)acrylate (MOI) (disclosed in Japanese Unexamined Patent Application Publication NO. 4-67314).

On the other hand, in the case of using the polyurethane resins, typically, a (meth)acrylate compound having a hydroxy group in the molecule thereof may be used as part of the material for synthesizing polyurethane to produce a radiation curable polyurethane resin (disclosed in Japanese Patent No. 2610468), or a polyurethane whose polymer end is a isocyanate group may be prepared and subsequently allowed to react with an alcohol having an acrylic double bond (disclosed in Japanese Examined Patent Application Publication No. 3-1727).

As for the electron-beam curable polyurethane resins, if an acrylic double bond can be introduced to the active hydrogen, which is typically the hydroxy group, of a known thermosetting polyurethane resin, in the same manner as in the vinyl chloride resins, commercially available polyurethane resins can be modified to be electron-beam sensitive.

The thermosetting polyurethane resin however has a smaller amount of active hydrogen in the molecule thereof than that of thermosetting vinyl chloride resins. Hence, when the modification is performed by the same technique as in the vinyl chloride resins, only a small number of acrylic double bonds can be introduced and, consequently, crosslinking of the coating film cured by electron-beam is disadvantageously insufficient.

SUMMARY OF THE INVENTION

Accordingly, an object of the present invention is to provide an electron-beam curable polyurethane resin having excellent crosslinking characteristics and which is suitably used for magnetic recording media, by electron-beam sensitive modification of a known thermosetting polyurethane resin, to provide a method for easily producing the electron-beam curable polyurethane resin having excellent crosslinking characteristics, from a known thermosetting polyurethane resin, and to provide a high-performance magnetic recording medium by using the electron-beam curable polyurethane resin.

The inventors of the present invention have conducted intensive research to overcome the above-described challenges. Consequently, they have found that an electron-beam curable polyurethane resin having excellent crosslinking characteristics can be produced by using a known polyurethane resin as the raw material and modifying it with a compound having at least two acrylic double bonds, and thus, accomplished the present invention.

Specifically, the electron-beam curable polyurethane resin for magnetic recording media, a method for producing the same, and a magnetic recording medium using the same are as follows.

(1) The electron-beam curable polyurethane resin for magnetic media is produced by modifying a polyurethane resin having recording active hydrogen in the molecule thereof with a compound having at least two acrylic double bonds, wherein the modification is performed on the active hydrogen so that the polyurethane resin becomes electron-beam curable.

(2) To produce the electron-beam curable polyurethane resin for magnetic recording media described in (1), in the method for producing the electron-beam curable polyurethane resin for magnetic recording media, the active hydrogen of a polyurethane resin having active hydrogen in the molecule thereof is allowed to react with a compound having at least two acrylic double bonds and an isocyanate group in the molecule thereof, thereby being modified to be electron-beam curable.

(3) In the method described in (2), the compound is prepared by allowing an isocyanurate to react with an alcohol having at least one acrylic double bond in the molecule thereof.

(4) The magnetic recording medium comprises a non-magnetic substrate provided with a layer containing the electron-beam curable polyurethane resin for magnetic recording media described in (1).

DESCRIPTION OF THE PREFERRED EMBODIMENTS

The embodiments of the present invention will now be illustrated in detail.

The electron-beam curable polyurethane resin for magnetic recording media of the present invention is produced by electron-beam sensitive modification of a predetermined polyurethane resin, used as the raw material, using a predetermined compound (hereinafter referred to as a "modifying compound").

The raw material polyurethane resin used in the present invention may be a known (general-purpose) polyurethane resin or a newly developed polyurethane resin. However, the polyurethane resin must have active hydrogen, such as the hydroxy group, primary amine, or secondary amine, in the molecule thereof in order to carry out reaction.

Such polyurethane resins are not particularly limited, but include, for example, Estane 5776P, 5788P, and 5799P (produced by BF Goodrich Co.); UR8200, UR8300, and UR8700 (produced by Toyobo Co., Ltd); and N-2301, N-2304, N-3167, N-3301, N-4325, and TK501K (produced by Nippon Polyurethane Industry Co., Ltd.).

As the modifying compound allowed to react with the active hydrogen of these polyurethane resins in order to carry out electron-beam sensitive modification, a compound is used which has both at least two acrylic double bonds and an isocyanate group in the molecule thereof. This modifying compound can be prepared by, for example, allowing two of the three isocyanate groups in a hexamethylene diisocyanate (HDI) trimer (isocyanurate) to react with a compound having both a hydroxy group and an acrylic double bond so as to have two acrylic double bonds and one isocyanate group. The resulting modifying compound is allowed to react with, for example, the hydroxy group of a polyurethane resin. Thus, two acrylic double bonds can be introduced for one hydroxy group of the polyurethane resin.

The isocyanurate is not particularly limited, and other isocyanurates, such as of tolylene diisocyanate (TDI) and isophorone diisocyanate (IDI) may be used instead of HDI. The compound allowed to react with the isocyanurate, having both a hydroxy group and at least one acrylic double bond, that is, an alcohol having at least one acrylic double bond in the molecule thereof, is not particularly limited, and exemplary compounds include 2-hydroxyethyl acrylate (2-HEA), 2-hydroxyethyl methacrylate (2-HEMA), 2-hydroxypropyl acrylate, hydroxydiethylene glycol methacrylate, butoxyhydroxypropyl acrylate, phenoxyhydroxypropyl acrylate, hydroxypropyl dimethacrylate, glycerol dimethacrylate, and monohydroxypentaerythritol triacrylate.

Synthesis of the electron-beam curable polyurethane resin is performed as described above, through a reaction of urethane formation between three compounds consisting of the isocyanurate, the alcohol having at least one acrylic double bond in the molecule thereof, and the polyurethane resin having active hydrogen.

As for the method for the synthesis, preferably, the isocyanurate and the alcohol having at least one acrylic double bond in the molecule thereof are precedently allowed to react with each other to prepare the above-described modifying compound, and then the polyurethane resin having active hydrogen is allowed to react.

In general, a catalyst for urethane formation, such as dibutyltin dilaurate or tin octylate, is preferably used in an amount of 0.005 to 0.1 part by weight relative to 100 parts by weight in total of reactants, in the synthesis. However, the catalyst for urethane formation is not always necessary. The synthesis reaction temperature is preferably 30 to 80° C., and more preferably 50 to 70° C.

The resulting electron-beam curable polyurethane resin can be used as a binder of a resin undercoat layer, an undercoat layer containing an inorganic pigment, a backcoat layer, and a magnetic layer, in a magnetic recording medium. Hereinafter, these layers are collectively referred to as "functional layers". The electron-beam curable polyurethane resin may be used singly or in combination with other resins such as vinyl chloride resins.

Crosslinking of the electron-beam curable polyurethane resin is performed with an electron-beam preferably at an exposure dose of 1 to 10 Mrad, and more preferably 3 to 7 Mrad. The exposure energy (acceleration voltage) is preferably 100 kV or more.

In the present invention, by using the above-described electron-beam curable polyurethane resin as a binder of the functional layers, a high-performance magnetic recording medium can be obtained which includes highly crosslinked, highly solvent-resistant functional layers. The magnetic recording medium of the present invention needs to have a layer containing the electron-beam curable polyurethane resin of the present invention on a non-magnetic substrate. However, the other construction materials and additives are not particularly limited, and the following materials may be used.

The material of the non-magnetic substrate may appropriately be selected from known resin films, such as polyester, polyamide, and aromatic polyamide, and laminates of these resin films. The thickness of the substrate is in a known range, and is also not particularly limited.

The ferromagnetic powder used for the magnetic layer is acicular ferromagnetic metallic powder having a mean long-axis length of preferably 0.15 µm or less, and more preferably 0.05 to 0.10 µm. If the mean long-axis length is more than 0.15 µm, electromagnetic conversion characteristics (particularly S/N and C/N ratios) required for magnetic recording media tend not to be satisfied. Alternatively, a hexagonal iron oxide powder, such as barium ferrite, may be used. The platy ratio of the hexagonal iron oxide powder is preferably 2 to 7. Also, the mean primary plate diameter is preferably 10 to 50 nm when observed by TEM. If it is large, the surface of the magnetic layer tends to deteriorate.

It is sufficient that the magnetic layer composition contains 70 to 90 percent by weight of such ferromagnetic powder. An excessively high content of the ferromagnetic powder results in a low content of the binder, and consequently the surface smoothness by calendaring is liable to deteriorate. In contrast, an excessively low content of the ferromagnetic powder tends not to provide a high reproduction output.

Preferred binder resins for the magnetic layer include the electron-beam curable polyurethane resin of the present invention, known thermoplastic resins and thermosetting resins, other radiation curable resins, and their mixtures, but are not particularly limited to these. Also, a mixture of the electron-beam curable polyurethane resin of the present invention and other binder resins may be used.

The content of the binder resin used for the magnetic layer is 5 to 40 parts by weight relative to 100 parts by weight of the ferromagnetic powder, and a content of 10 to 30 parts by weight is particularly preferable. An excessively low content of the binder resin degrades the strength of the magnetic layer, and consequently the running durability tents to deteriorate. In contrast, an excessively high content results in a reduced content of the ferromagnetic metallic powder content, consequently degrading electromagnetic conversion characteristics.

Cross-linkers for curing the binder resin include known various types of polyisocyanate, and the cross-linker content is preferably 10 to 30 parts by weight relative to 100 parts by weight of the binder resin. The magnetic layer may also contain an abrasive, a dispersant such as a surfactant, a higher fatty acid, and other additives, if necessary.

A paint for magnetic layer formation is prepared by adding an organic solvent to the above-described ingredients. The organic solvent is not particularly limited, and may be at least one appropriately selected from among various solvents including ketones, such as methyl ethyl ketone (MEK), methyl isobutyl ketone, and cyclohexanone, and aromatic solvents, such as toluene. The organic solvent content is about 100 to 900 parts by weight relative to 100 parts by weight in total of solids (the ferromagnetic metallic powder, various types of inorganic grains, and the like) and the binder resin.

The thickness of the magnetic layer, in the present invention, is 0.50 µm or less, preferably 0.01 to 0.50 µm, and more preferably 0.02 to 0.30 µm. An excessively large thickness leads to an increased self-demagnetization loss and thickness loss.

A non-magnetic layer serving as the undercoat layer may be disposed between the magnetic layer and the non-magnetic substrate, thereby improving electromagnetic conversion characteristics of the magnetic layer having a reduced thickness. Thus, reliability is further increased.

Various types of inorganic powder can be used as the non-magnetic powder for the non-magnetic layer, and preferred inorganic powders include acicular non-magnetic powders, such as acicular non-magnetic iron oxide ($\alpha$-$Fe_2O_3$). The non-magnetic layer may further contain various types of non-magnetic powder, such as calcium carbonate ($CaCO_3$), titanium oxide ($TiO_2$), barium sulfate (BaSO4), and $\alpha$-alumina ($\alpha$-$Al_2O_3$), if necessary. Preferably, the non-magnetic layer contains carbon black. The carbon black may be furnace black for rubber, thermal black for rubber, black for color, acetylene black, and the like.

The compounding ratio of the carbon black to the inorganic powder is preferably 100:0 to 10:90 by weight. If the inorganic powder ratio is more than 90, a problem of surface electric resistance is liable to occur.

Exemplary binders for the non-magnetic layer include the electron-beam curable polyurethane of the present invention, known thermoplastic resins and thermosetting resins, other radiation curable resins, and their mixtures, as in the magnetic layer, and the radiation curable resins are particularly suitable.

The non-magnetic layer may further contain a dispersant such as a surfactant and other additives, if necessary. The paint for the non-magnetic layer may be prepared by adding the same organic solvent as in the above-described magnetic layer in a similar amount.

The thickness of the non-magnetic layer is preferably 2.5 µm or less, and more preferably 0.1 to 2.3 µm. Even if the thickness is increased to more than 2.5 µm, performance is not enhanced. On the contrary, strict conditions are required for coating because the thickness of the coating is liable to become nonuniform, and the surface smoothness is also liable to deteriorate.

The backcoat layer is intended to enhance the running stability and to prevent electrification of the magnetic layer, and is provided if required. Preferably, the backcoat layer contains 30 to 80 percent by weight of carbon black. As the carbon black, any type can be used as long as it is generally used, and the same carbon black as in the above-described non-magnetic layer may be used. In addition to the carbon black, the backcoat layer may further contain various types of non-magnetic, inorganic powder used for the magnetic layer, such as an abrasive; a dispersant such as a surfactant; a higher fatty acid; a fatty ester; a lubricant, such as silicone oil, and other various types of additives.

The thickness (after calendaring) of the backcoat layer is 0.1 to 1.0 µm, and preferably 0.2 to 0.8 µm. If the thickness is more than 1.0 µm, the friction between a medium-sliding path and the medium becomes excessively large, and consequently the running stability tends to deteriorate. In contrast, in the case of a thickness of less than 0.1 µm, the coating of the backcoat layer is liable to be shaved off while the medium is running.

As described above, according to the present invention, an electron-beam curable polyurethane resin for magnetic recording media can be produced using a known polyurethane resin having active hydrogen as the raw material. The resulting electron-beam curable polyurethane resin has excellent crosslinking characteristics, and thus a high-performance recording magnetic medium can be provided.

EXAMPLES

The present invention will further be described in detail using examples. However, the examples do not limit the present invention. In the following description, "part(s)" refers to "part(s) by weight".

Synthesis Example 1

Polyurethane Acrylate Resin (1)

A one litter, three-neck flask was charged with 504 parts of HDI nurate, 0.18 part of dibutyltin dilaurate, and 0.22 part of 2,6-tert-butyl-4-methylphenol (BHT), and 232 parts of 2-hydroxyethyl acrylate was dripped while temperature was controlled to 60° C. After dripping, the sample was stirred at 60° C. for 2 hours and taken out. Thus, HDI nurate-2-HEA adduct (modifying compound) was obtained.

Next, 262 parts of Estane 5778P produced by BF Goodrich Co., 700 parts of methyl ethyl ketone (MEK), 0.5 part of dibutyltin dilaurate, and 0.05 part of 2,6-tert-butyl-4-methylphenol (BHT) were compounded and stirred at 70° C. for 3 hours. Then, 38 parts of the previously prepared HDI nurate-2-HEA adduct (modifying compound) was added. After stirring at 70° C. for 15 hours, it was made sure that the isocyanate characteristic absorption peak (2270 $cm^{-1}$) had disappeared in the IR spectrum, and then the sample was taken out. Thus, polyurethane acrylate resin (1) was obtained.

Synthesis Example 2

Polyurethane Acrylate Resin (2)

A one litter, three-neck flask was charged with 504 parts of HDI nurate, 0.18 part of dibutyltin dilaurate, and 0.22 part of 2,6-tert-butyl-4-methylphenol (BHT), and 260 parts of 2-hydroxyethyl methacrylate (2-HEMA) was dripped while temperature was controlled to 60° C. After dripping, the sample was stirred at 60° C. for 2 hours and taken out. Thus, HDI nurate-2-HEMA adduct (modifying compound) was obtained.

Next, 262 parts of Estane 5778P produced by BF Goodrich Co., 700 parts of MEK, 0.5 part of dibutyltin dilaurate, and 0.05 part of 2,6-tert-butyl-4-methylphenol (BHT) were compounded and stirred at 70° C. for 3 hours. Then, 40 parts of the previously prepared HDI nurate-2-HEMA adduct (modifying compound) was added. After stirring at 70° C. for 15 hours, it was made sure that the isocyanate characteristic absorption peak (2270 $cm^{-1}$) had disappeared in the IR spectrum, and then the sample was taken out. Thus, polyurethane acrylate resin (2) was obtained.

Synthesis Example 3

Polyurethane Acrylate Resin (3)

A one litter, three-neck flask was charged with 504 parts of HDI nurate, 0.18 part of dibutyltin dilaurate, and 0.22 part of 2,6-tert-butyl-4-methylphenol, and 496-parts of monohydroxypentaerythritol triacrylate was dripped while temperature was controlled to 60° C. After dripping, the sample was stirred at 60° C. for 2 hours and taken out. Thus, HDI nurate-monohydroxypentaerythritol triacrylate adduct (modifying compound) was obtained.

Next, 230 parts of Estane 5778P produced by BF Goodrich Co., 615 parts of MEK, 0.5 part of dibutyltin dilaurate, and 0.05 part of 2,6-tert-butyl-4-methylphenol (BHT) were compounded and stirred at 70° C. for 3 hours. Then, 53 parts of the previously prepared HDI nurate-monohydroxypentaerythritol triacrylate adduct (modifying compound) was added. After stirring at 70° C. for 15 hours, it was made sure that the isocyanate characteristic absorption peak (2270 $cm^{-1}$) had disappeared in the IR spectrum, and then the sample was taken out. Thus, polyurethane acrylate resin (3) was obtained.

Synthesis Example 4

Polyurethane Acrylate Resin (4)

A one litter, three-neck flask was charged with 333 parts of IPDI nurate, 450 parts of MEK, 0.44 part of dibutyltin dilaurate, and 0.27 part of 2,6-tert-butyl-4-methylphenol (BHT), and 116 parts of 2-hydroxyethyl acrylate (2-HEA) was dripped while temperature was controlled to 60° C. After dripping, the sample was stirred at 60° C. for 5 hours and taken out. Thus, IPDI nurate-2-HEA adduct (modifying compound) was obtained.

Next, 254 parts of Estane 5778P produced by BF Goodrich Co., 654 parts of MEK, 0.5 part of dibutyltin dilaurate, and 0.05 part of 2,6-tert-butyl-4-methylphenol (BHT) were compounded and stirred at 70° C. for 3 hours. Then, 92 parts of the previously prepared IPDI nurate-2-HEA adduct (modifying compound) was added. After stirring at 70° C. for 15 hours, it was made sure that the isocyanate characteristic absorption peak (2270 $cm^{-1}$) had disappeared in the IR spectrum, and then the sample was taken out. Thus, polyurethane acrylate resin (4) was obtained.

Synthesis Example 5

Polyurethane Acrylate Resin (5)

In a one litter, three-neck flask, 833 parts of Vylon UR8300 produced by Toyobo Co., Ltd., 0.5 part of dibutyltin dilaurate, and 0.05 part of 2,6-tert-butyl-4-methylphenol (BHT) were placed and stirred at 70° C. for 1 hours. Then, 13 parts of the previously prepared HDI nurate-2-HEA adduct (modifying compound) was added. After stirring at 70° C. for 15 hours, it was made sure that the isocyanate characteristic absorption peak (2270 $cm^{-1}$) had disappeared in the IR spectrum, and then the sample was taken out. Thus, polyurethane acrylate resin (5) was obtained.

Synthesis Example 6

Polyurethane Acrylate Resin (6)

In a one litter, three-neck flask, 230 parts of Estane 5778P produced by BF Goodrich Co., 520 parts of MEK, 0.5 part of dibutyltin dilaurate, and 0.3 part of hydroquinone were placed and stirred at 70° C. for 3 hours. Then, 8 parts of 2-isocyanateethyl methacrylate was added. After stirring at 70° C. for 15 hours, it was made sure that the isocyanate characteristic absorption peak (2270 $cm^{-1}$) had disappeared in the IR spectrum, and then the sample was taken out. Thus, polyurethane acrylate resin (6) was obtained.

Synthesis Example 7

Polyurethane Acrylate Resin (7)

A one litter, three-neck flask was charged with 348 parts of tolylene diisocyanate (TDI) and heated to 80° C. Then, 260 parts of 2-hydroxyethyl methacrylate (2-HEMA), 0.07 part of tin octylate, and 0.05 part of hydroquinone were dripped while temperature was controlled to 80° C. After dripping, the sample was stirred at 80° C. for 3 hours and taken out. Thus, TDI-2-HEMA adduct was obtained.

Next, 226 parts of Estane 5778P produced by BF Goodrich Co., 560 parts of MEK, 0.5 part of dibutyltin dilaurate, and 0.05 part of 2,6-tert-butyl-4-methylphenol (BHT) were compounded and stirred at 80° C. for 3 hours. Then, 14 parts of the previously prepared TDI-2-HEMA adduct was added. After stirring at 80° C. for 15 hours, it was made sure that the isocyanate characteristic absorption peak (2270 $cm^{-1}$) had disappeared in the IR spectrum, and then the sample was taken out. Thus, polyurethane acrylate resin (7) was obtained.

Synthesis Example 8

Polyurethane Acrylate Resin (8)

In a one litter, three-neck flask, 200 parts of Estane 5778P produced by BF Goodrich Co. and 525 parts of MEK were placed and stirred at 80° C. for 3 hours. Then, 6 parts of 1,2-cyclohexanedicarboxylic anhydride was added and allowed to react at 80° C. until the anhydride characteristic absorption peaks (1790 $cm^{-1}$ and 1870 $cm^{-1}$) disappeared. Furthermore, 12 parts of 1,2-cyclohexanedicarboxylic anhydride, 17 parts of glycidyl methacrylate, 0.02 part of hydroquinone, and 0.1 part of triethanolamine were slowly added and stirred at 80° C. for 20 hours. Then, it was made sure that the acid value was 4 or less, and the sample was taken out to obtain polyurethane acrylate resin (8).

Example 1

Evaluation 1: Evaluation of Crosslinking Characteristics

A coating of polyurethane acrylate resin (1) was formed to a thickness of 30 μm on a separation film, and was then exposed to an electron beam of 6 Mrad under the condition of an acceleration voltage of 200 kV to be cured. Next, the polyurethane resin coating film cured with electron beam was removed from the separation film, and the gel fraction was measure under the following conditions.
<Gel Fraction Measurement Conditions>
Solvent: methyl ethyl ketone (MEK)
Extraction condition: boiling in MEK
Extraction time: 5 hours Extraction was performed under the conditions above. The polyurethane resin coating film was weighed before and after the extraction, and the gel fraction was calculated from the difference between the obtained weights.

Evaluation 2: Evaluation of Crosslinking Characteristics of Coating Films Containing Pigment or Magnetic Powder For three types of coating, a magnetic metallic powder (magnetic paint), an α-iron oxide/carbon black mixture (non-magnetic paint), and a carbon black (carbon black paint) were each dispersed in polyurethane acrylate resin (1), and crosslinks were formed. Solvent resistances of these samples were evaluated to estimate crosslinking characteristics.

(1) Evaluation of Magnetic Metallic Powder

Preparation of Magnetic Paint Sample

| | |
|---|---|
| Magnetic metallic powder (Fe/Co/Al/Y = 100/10/5.2/2.0 (by weight) (Hc = 144.6 kA/m (1830 Oe), σs = 130 Am²/kg, BET = 57 m²/g, mean long-axis length = 0.10 μm) | 100 parts by weight |
| Polyurethane acrylate resin (1) | 70 parts by weight |
| MEK | 120 parts by weight |
| Toluene | 120 parts by weight |
| Cyclohexanone | 70 parts by weight |

After being mixed and kneaded, these ingredients were dispersed with a sand grinder mill to prepare a magnetic paint.

Next, the resulting magnetic paint was applied on a polyethylene terephthalate (PET) film having a thickness of 6.1 μm so as to result in a dried thickness of 1.5 μm. After drying at a temperature of 100° C., calendaring was performed at a linear pressure of 2.9×10⁵ N/m and a temperature of 90° C. and subsequently electron beam (EB) exposure (6 Mrad) was performed. Thus, a cured magnetic coating film was prepared.

(2) Evaluation of α-iron Oxide/carbon Black Pigment Mixture

Preparation of Non-magnetic Paint Sample

| | |
|---|---|
| Non-magnetic powder: acicular α-Fe₂O₃ (mean short-axis diameter: 18 nm, aspect ratio: 6.1, pH: 8.9) | 80 parts by weight |
| Carbon black (#850B produced by Mitsubishi Chemical Co.) (mean particle size: 16 nm, BET: 200 m²/g, DBP oil absorption: 70 mL/100 g) | 20 parts by weight |
| Polyurethane acrylate resin (1) | 70 parts by weight |
| MEK | 120 parts by weight |
| Toluene | 120 parts by weight |
| Cyclohexanone | 70 parts by weight |

After being mixed and kneaded, these ingredients were dispersed with a sand grinder mill to prepare a non-magnetic paint.

Next, the resulting non-magnetic paint was applied on a PET film having a thickness of 6.1 μm so as to result in a dried thickness of 1.5 μm. After drying at a temperature of 100° C., calendaring was performed at a linear pressure of 2.9×10⁵ N/m and a temperature of 90° C. and subsequently EB exposure (6 Mrad) was performed. Thus, a cured non-magnetic coating film was prepared.

(3) Evaluation of Carbon Black Type

Preparation of Carbon Black Paint Sample

| | |
|---|---|
| Carbon black (Conductex SC produced by Columbian Carbon Co., mean particle size: 20 nm, BET: 220 m²/g) | 100 parts by weight |
| Carbon black (Sevacarb MT produced by Columbian Carbon Co., mean particle size: 350 nm, BET: 8 m²/g) | 1 part by weight |
| Polyurethane acrylate resin (1) | 330 parts by weight |
| MEK | 350 parts by weight |
| Toluene | 350 parts by weight |
| Cyclohexanone | 170 parts by weight |

After being mixed and kneaded, these ingredients were dispersed with a sand grinder mill.

Next, the resulting carbon black paint was applied on a PET film having a thickness of 6.1 μm so as to result in a dried thickness of 1.5 μm. After drying at a temperature of 100° C., calendaring was performed at a linear pressure of 2.9×10⁵ N/m and a temperature of 70° C. and subsequently EB exposure (6 Mrad) was performed. Thus, a cured carbon black coating film was prepared.

The solvent resistances of the film samples prepared in the above-described manner were evaluated according to the following procedure and criteria.

1. A cotton swab impregnated with MEK was used.
2. The surfaces of the films were rubbed with the cotton swab.
3. It was counted how many times of rubbing were performed before the film disappeared.
4. 10 times or more: good
5 to 10 times: fair
1 to 5 times: bad Example 2

Coating film samples were prepared and the gel fractions and solvent resistances were evaluated, in an identical manner to Example 1 except that polyurethane acrylate resin (2) was used instead of polyurethane acrylate resin (1) used in Example 1.

Example 3

Coating film samples were prepared and the gel fractions and solvent resistances were evaluated, in an identical manner to Example 1 except that polyurethane acrylate resin (3) was used instead of polyurethane acrylate resin (1) used in Example 1.

Example 4

Coating film samples were prepared and the gel fractions and solvent resistances were evaluated, in an identical manner to Example 1 except that polyurethane acrylate resin (4) was used instead of polyurethane acrylate resin (1) used in Example 1.

Example 5

Coating film samples were prepared and the gel fractions and solvent resistances were evaluated, in an identical manner to Example 1 except that polyurethane acrylate resin (5) was used instead of polyurethane acrylate resin (1) used in Example 1.

Comparative Example 1

Coating film samples were prepared and the gel fractions and solvent resistances were evaluated, in an identical manner to Example 1 except that polyurethane acrylate resin (6) was used instead of polyurethane acrylate resin (1) used in Example 1.

Comparative Example 2

Coating film samples were prepared and the gel fractions and solvent resistances were evaluated, in an identical manner to Example 1 except that polyurethane acrylate resin (7) was used instead of polyurethane acrylate resin (1) used in Example 1.

Comparative Example 3

Coating film samples were prepared and the gel fractions and solvent resistances were evaluated, in an identical manner to Example 1 except that polyurethane acrylate resin (8) was used instead of polyurethane acrylate resin (1) used in Example 1.

Comparative Example 4

In 700 g of MEK, 300 g of Estane 5778P produced by BF Goodrich Co. was dissolved to prepare a polyurethane resin solution. Coating film samples were prepared and the gel fractions and solvent resistances were evaluated, in an identical manner to Example 1 except that this polyurethane resin solution was used instead of polyurethane acrylate resin (1) used in Example 1.

TABLE 1

| | | | Solvent resistance | | |
|---|---|---|---|---|---|
| | Resin | Gel fraction (%) | Magnetic coating film | Non-magnetic coating film | Carbon black coating film |
| Example 1 | Polyurethane acrylate resin (1) | 96 | Good | Good | Good |
| Example 2 | Polyurethane acrylate resin (2) | 95 | Good | Good | Good |
| Example 3 | Polyurethane acrylate resin (3) | 98 | Good | Good | Good |
| Example 4 | Polyurethane acrylate resin (4) | 96 | Good | Good | Good |
| Example 5 | Polyurethane acrylate resin (5) | 85 | Good-Fair | Good-Fair | Good-Fair |
| Comparative Example 1 | Polyurethane acrylate resin (6) | 20 | Bad | Bad | Bad |
| Comparative Example 2 | Polyurethane acrylate resin (7) | 5 | Bad | Bad | Bad |
| Comparative Example 3 | Polyurethane acrylate resin (8) | 5 | Bad | Bad | Bad |
| Comparative Example 4 | Polyurethane resin solution | 0 | Bad | Bad | Bad |

According to the results shown in Table 1 above, it has been shown that the polyurethane resins of the examples produced by modifying a polyurethane resin having active hydrogen with a compound having two or more of acrylic double bonds and an isocyanate group in the molecule thereof have more excellent crosslinking characteristics than those of the known polyurethane resin used in the comparative examples and can result in cured coating films having better solvent resistance to a magnetic paint, a non-magnetic paint, and a black carbon paint.

The invention claimed is:

1. A method for making an electron-beam curable polyurethane resin comprising:
   reacting a polyurethane resin having active hydrogen in the molecule thereof with a compound having at least two acrylic double bonds and at least one isocyanate group,
   wherein the active hydrogen in the polyurethane resin reacts with the compound having at least two acrylic double bonds and at least one isocyanate group to form the electron-beam curable polyurethane resin.

2. The method of claim 1, further comprising preparing the compound having at least two acrylic double bonds and at least one isocyanate group by
   reacting an isocyanate group on an isocyanurate with an alcohol having at least one acrylic double bond in the molecule thereof.

3. The method of claim 2, wherein the isocyanurate is selected from the group consisting of hexamethylene diisocyanate (HDI) trimer, tolylene diisocyanate (TDI) trimer, and isophorone diisocyanate (IPDI) trimer.

4. The method of claim 2, wherein said alcohol having at least one acrylic double bond is selected from the group consisting of 2-hydroxyethyl acrylate (2-HEA), 2-hydroxyethyl methacrylate (2-HEMA), 2-hydroxypropyl acrylate, hydroxydiethylene glycol methacrylate, butoxyhydroxypropyl acrylate, phenoxyhydroxypropyl acrylate, hydroxypropyl dimethacrylate, glycerol dimethacrylate and monohydroxypentaerythritol triacrylate.

5. The method of claim 1, wherein no catalyst for urethane formation is used.

6. The method of claim 1, wherein a catalyst for urethane formation is used.

7. The method of claim 1, wherein 0.005 to 0.1 part by weight of dibutyltin dilaurate or tin octylate relative to 100 parts by weight of the reactants is used as a catalyst for urethane formation.

8. The method of claim 1, wherein said polyurethane resin having active hydrogen in the molecule thereof contains a hydroxyl group.

9. The method of claim 1 wherein said polyurethane resin having active hydrogen in the molecule thereof contains a primary amine group.

10. The method of claim 1 wherein said polyurethane resin having active hydrogen in the molecule thereof contains a secondary amine group.

11. An electron-beam curable polyurethane resin produced by the method of claim 1.

12. An electron-beam cured polyurethane resin produced by exposing the curable polyurethane resin of claim 11 to an electron beam.

13. The electron-beam cured polyurethane resin of claim 12, which has been crosslinked by an electron-beam at an exposure dose of 1 to 10 Mrad.

14. The electron-beam cured polyurethane resin of claim 12, which has been crosslinked by an electron-beam at an exposure dose of 3 to 7 Mrad.

15. An electron-beam curable polyurethane resin produced by the method of claim 2.

16. An electron-beam curable polyurethane resin produced by the method of claim 3.

17. A magnetic recording medium comprising the electron-beam curable polyurethane resin produced by the method of claim 1.

18. The magnetic recording medium of claim 17, further comprising a non-magnetic substrate provided with a layer containing the electron-beam curable polyurethane resin.

* * * * *